United States Patent [19]

Shum

[11] Patent Number: 4,658,597
[45] Date of Patent: Apr. 21, 1987

[54] SOLAR POWERED AUTOMOBILE COOLING SYSTEM

[76] Inventor: Shu Shum, 3720 Farwell Dr., Amarillo, Tex. 79109

[21] Appl. No.: 751,540

[22] Filed: Jul. 3, 1985

[51] Int. Cl.⁴ .................. F25B 27/00; B60H 1/32; H01L 35/12
[52] U.S. Cl. .................. 62/235.1; 62/244; 62/236; 62/310; 62/171; 136/236.1
[58] Field of Search .......... 62/304, 309, 310, 244, 62/171, 236, 235.1, 239, 241; 136/236.1, 224, 225

[56] References Cited

U.S. PATENT DOCUMENTS 2,970,456 2/1961 Rice ........................ 62/310
3,943,726 3/1976 Miller ...................... 62/236

Primary Examiner—Henry A. Bennet
Attorney, Agent, or Firm—Duckworth, Allen & Dyer

[57] ABSTRACT

An automobile cooling system where electrical energy derived from solar cells are used to drive the pump and fan of a vehicle mounted evaporative cooling system. Automatic control of the system is provided by a thermostatic switch located within the vehicle.

7 Claims, 4 Drawing Figures

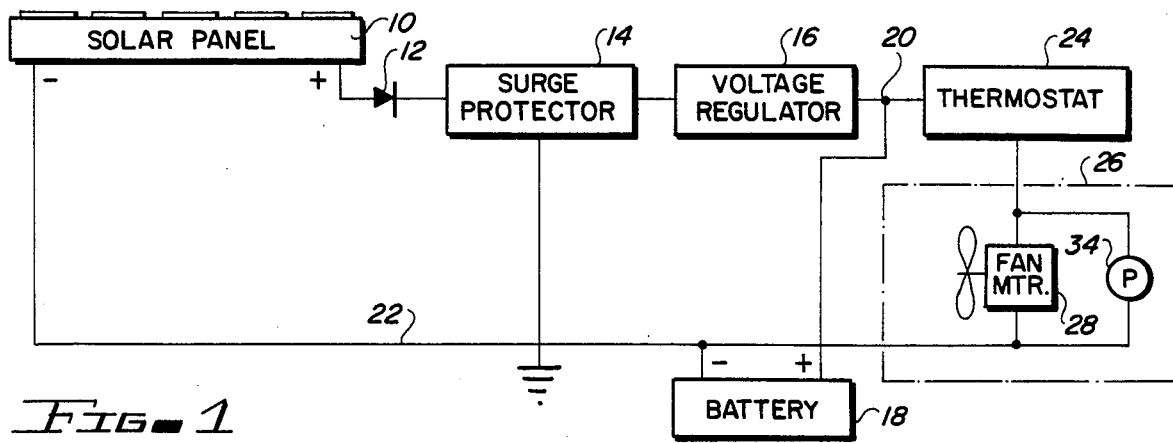
Fig-1
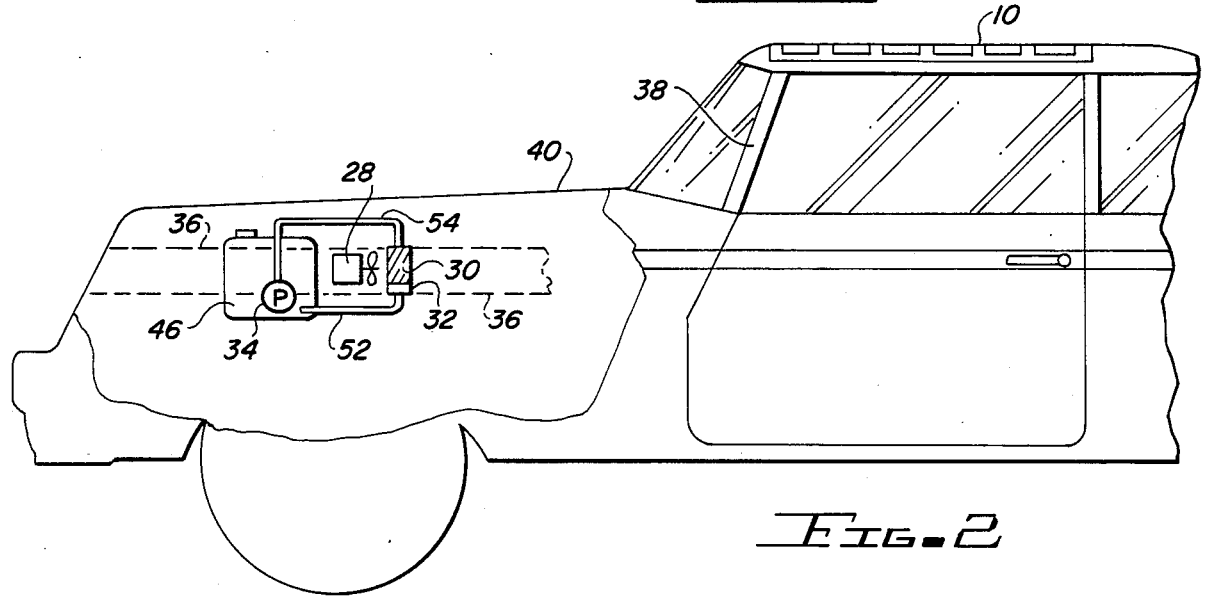
Fig-2
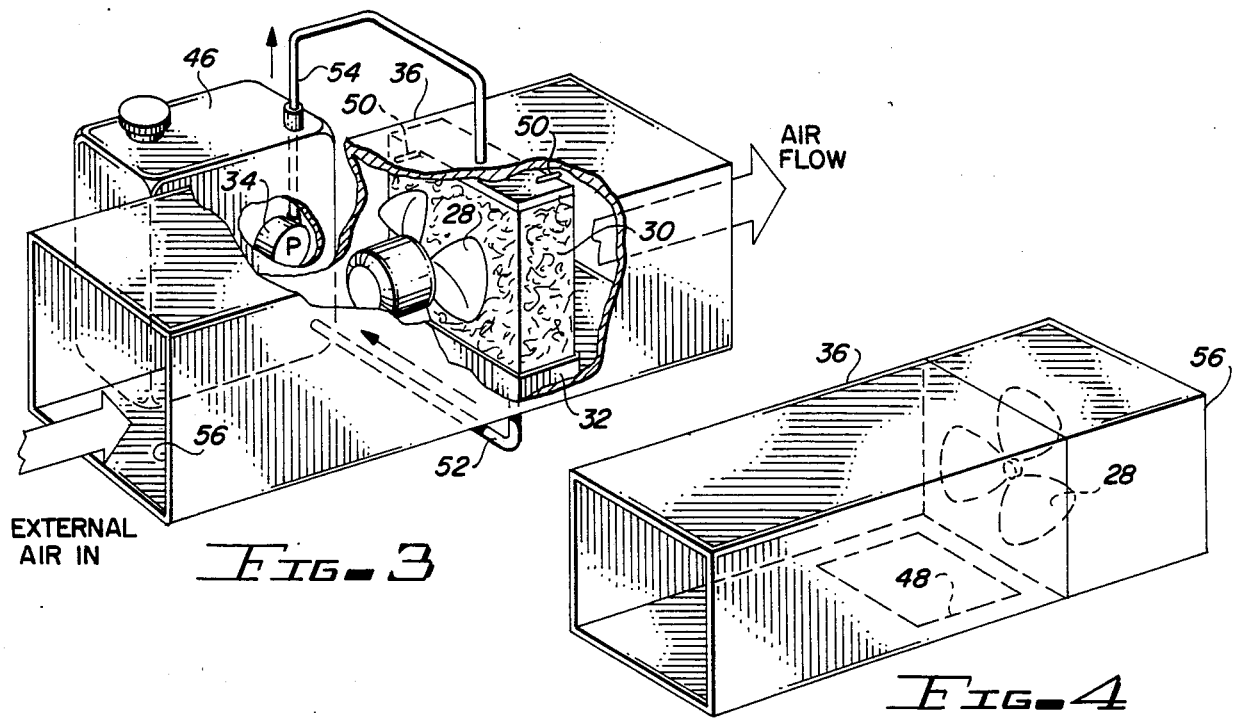
Fig-3
Fig-4

SOLAR POWERED AUTOMOBILE COOLING SYSTEM

BACKGROUND OF THE INVENTION

This invention relates to automobile cooling systems and, more particularly, to a system for cooling the passenger compartment of an automobile without operating the automobile's engine.

As is well known, an automobile parked in the sun with its windows closed will experience a greenhouse effect, i.e., the interior of the automobile will become extremely hot. With an outside air temperature of 80-90 degrees Fahrenheit, the temperature in the passenger compartment of an automobile can soar as high as 150 degrees Fahrenheit. Nevertheless, there are regularly documented reports of animals and children being severely injured by being left unattended in closed and locked parked automobiles. Of less significance is damage to temperature sensitive materials such as tape cassettes and plastic components of the automobile per se.

Most cooling systems for passenger automobiles have been designed to use air conditioning systems of the type which require the vehicle engine to be operating while the cooling system operates. Recently, U.S. Pat. No. 3,943,726 has disclosed a system using a plurality of solar energy cells embedded in the trunk lid, the roof, the front hood and along the periphery of the rear window to provide electric power for a fan to draw outside air into the vehicle. This patent also states that the system could run an air conditioner although such latter alternative is not operably described. More recently, U.S. Pat. No. 4,280,330 discloses a battery operated heating and cooling system using a Peltier type of thermoelectric device to provide a heat pump coupled with a blower to circulate air over the device and into the compartment. Although forcing outside air into the vehicle will help in lowering the inside temperature, it will be apparent that such efforts will be minimally acceptable for higher outside air temperatures, for example, temperatures exceeding 100 degrees which are common in the southwest United States. Furthermore, a large volume of untreated air would need be moved to overcome the greenhouse effect in order to begin to bring the internal vehicle temperature into correspondence with outside air temperature. While the heat pump approach described in U.S. Pat. No. 4,280,330 will allow ambient air to be cooled, the system is not energy efficient since it requires electric heating for heat transfer and is further time limited by the available energy in the storage battery.

It is an object of the present invention to provide a cooling system for an automobile passenger compartment which operates without engine power and can cool the interior to the ambient temperature.

It is another object of the present invention to provide a self-powered cooling system which can provide additional electrical energy to a vehicle storage battery.

It is still another object of the present invention to provide a solar powered evaporative cooling system for an automobile.

SUMMARY OF THE INVENTION

The above and other objects are attained in an automobile cooling system for the passenger compartment of an automobile through the utilization of an active cooling apparatus powered by a solar energy system mounted on the roof of the automobile. In one form, the cooling apparatus comprises an evaporative cooler including a water reservoir, an evaporative mesh pad, a pump for circulating water from the reservoir to the pad and a fan for blowing air over the pad and into the passenger compartment. The cooling apparatus may be implemented by the addition of only the mesh pad and water reservoir by using the existing blower fan which is normally supplied in an automobile for circulating air into the passenger compartment. In addition, the pump may be the windshield washer pump with additional tubing connected to supply water to the mesh pad. The system can be activated by a thermostatic switch positioned within the automobile and electrically connected in a series circuit between the solar power system and the evaporative cooling system. When the temperature within the automobile climbs above a pre-determined value, the thermostatic switch will close allowing power to be supplied to the evaporative cooling system to activate the fan and pump and to effect cooling of the passenger compartment. Preferably, the solar power system is connected to the evaporative cooling system through a blocking diode to prevent reverse current and also includes a voltage regulator for limiting the voltage applied at the evaporative cooling apparatus. The automobile battery may also be connected in parallel circuit arrangement with the combination of the evaporative cooling system and thermostatic switch such that the solar energy system may provide additional charging current for the battery when the evaporative cooling system is not required. Since the solar energy system is mounted on an outside surface of the automobile, there may also be provided a lightning or surge arrestor device connected between the solar system and the voltage regulator and battery system internally of the automobile. The solar energy system may comprise photovoltaic cells formed as traditional semiconductor devices or may comprise other types of solar energy conversion apparatus such as submicrometer metallic dipole antennas deposited on a glass substrate or a plurality of thermacouples also formed on a substrate.

BRIEF DESCRIPTION OF THE DRAWINGS

For a better understanding of the present invention, reference may be had to the following detailed description taken in conjunction with the accompanying drawings in which:

FIG. 1 is a functional block diagram of a vehicle cooling system in accordance with the present invention; and FIG. 2 is a simplified diagram of an automobile showing the positioning of the cooling apparatus and solar panel for powering the apparatus.

FIG. 3 shows one embodiment of the ventilation duct.

FIG. 4 shows another embodiment of the ventilation duct.

DETAILED DESCRIPTION OF THE DRAWINGS

Referring now to FIG. 1 there is shown a functional block diagram of a solar powered evaporative cooling system for an automobile in accordance with the present invention. A solar panel 10 is adapted to fit on a roof of an automobile for providing electric power. The panel 10 may comprise a conventional solar cell arrangement constructed of two different materials sandwiched together to form a semiconductor, the materials typically being composites of silicon and boron. Alternatively, the panels 10 may comprise an array of metallic submicrometer dipole antennas deposited on a glass substrate of the type described in U.S. Pat. No. 4,445,050 or may comprise a thermoelectric device in the form of a plurality of thermocouples printed on a substrate using two types of ink of suitably different powdered metals as described in U.S. Pat. No. 4,276,441.

The electric current generated by panel 10 is coupled via a blocking diode 12 and a lightning or surge arrestor 14 to a voltage regulator 16. In a preferred embodiment, a rechargeable storage battery 18 is connected between an output terminal 20 of the voltage regulator 16 and a current return line 22 of the panel 10. The current return line 22 is normally chosen to be at ground potential. The surge arrestor 14 also has one terminal connected to line 22 to effectively short-circuit lightning generated transients and to protect the battery 18 along with other components of the cooling system. A thermostatic switch 24 is serially connected between the terminal 20 and a cooling apparatus 26. The switch 24 allows energization of the cooling apparatus 26 when the temperature in the automobile passenger compartment rises above a predetermined value. Preferably, the cooling apparatus comprises a fan 28 positioned to force air through a mesh pad 30. The pad 30 is positioned above a water reservoir 32. A water pump 34 is arranged to pump water from the reservoir 32 onto the pad 30. Duct work 36 in which fan 28 operates serves as a conduit to bring outside air into a passenger compartment 38 of an automobile 40. Cooling of the air is effected by passage through the moisture-laden pad 30.

The present invention utilizes existing equipment within the automobile 40 to the extent possible. Referring to FIG. 2, the duct work 36 connects to standard air intake ducts in the automobile. The pump 34 can be a windshield washer pump and may be intermittently operated in the same manner as for a windshield washer or may be connected to a timer (not shown) actuated by the switch 24 to periodically cycle and pump water onto the pad 30. The appropriate routing of tubing for carrying water from reservoir 32 via pump 34 to pad 30 will be apparent. Alternatively, the reservoir 32 may be allowed to drain externally of the automobile 40 through a drain tube 44 and the water for pump 34 may be taken from a standard windshield washer reservoir 46. If pump 34 is desired to have a dual use to both supply windshield washer fluid and to wet pad 30, appropriate switchable couplers could be installed at the inlet and outlet parts of the pump 34. In such an arrangement, it would be advisable to assure that only water is used in the washer system to preclude the introduction of chemical fumes into the passenger compartment.

The fan 28 may likewise comprise a standard automobile blower fan which will be effective to cool the automobile 40 by merely re-routing the ductwork to connect with the pad 30.

Referring to FIG. 3, the ventilation duct work 36 is shown to be filled along one cross-section with the mesh along one cross-section with the mesh pad 30. The pad 30 is held in position by fasteners 50 inserted through the duct work walls. The tray or reservoir 32 collects the water which passes over and through the pad 30. In a closed circulating system the tray 32 has a drain opening to which is connected tubing 52. The tubing 52 leads to the storage reservoir 46. The pump 34 then pumps the coolant from reservoir 46 through tubing 54 back to the pag 30. The fan 28 is positioned in a fan box 56 in the duct work 36 to pull outside air in and blow it through the pad 30.

In another embodiment, the cooling apparatus 26 comprises a plurality of thermoelectric cooling devices 48 which utilize the Peltier phenomenon to provide a heat pump having no moving parts to transfer heat out of the automobile 40. As shown in FIG. 4 the devices 48 may be mounted in wall of the ventilator duct work 36 such that air from the blower fan 28 passes over the heat sink portion of the devices 48 exposed internally of the duct work. In such an arrangement, the duct work 36 need be adjacent a metal outer surface of the automobile to provide physical connection between the interior of the automobile and outside ambient air. The metallic car body thereby acts as a heat sink for the devices 48 to conduct heat from the inside to external of the automobile.

In one construction of the present invention using the evaporative cooling apparatus, the fan 28 and pump 34 were operated from a solar cell array of four 30-watt photocell panels. The system was mounted in a Chevrolet Vega automobile and caused a rapid drop from 150 degrees Fahrenheit to approximately 85 degrees inside the passenger compartment of the automobile.

If it is desired to isolate the battery 18 from the cooling apparatus 26, a switch (not shown) may be placed in circuit between terminal 20 and battery 18. Such switch may be useful to prevent the system from discharging the battery in the event of a short-circuit or failure of the solar panel 10. Although the primary function of the voltage regulator 16 is to regulate the voltage applied at the battery 18 to a nominal 13 volt value, the regulator 16 also senses the current available at the panel 10 by monitoring the panel voltage under load. If the current produced by the panel 10 is less than a pre-determined percent of the current required by the apparatus 26, the system is shut-off by regulator 16. If the battery 18 is connected as shown in FIG. 1, the regulator may sense that the battery 18 is furnished more current than desired and may open the switch 24 to shut down the system. A typical value for sensing inability of the panel 10 to supply current is if the current from panel 10 is less than 75 percent of the current to operate the system. Such a drop may occur when sunlight on the panel 10 is obscured in which case the heating of the automobile interior is reduced.

As can be seen, during periods when the cooling system is not required the panel 10 may be used to assist in charging the automobile battery 18. Such might be useful during winter when extra cranking power is required or when electric defrosters are used.

Although the invention has been described in what is considered to be a preferred embodiment, it will be apparent that many modifications are possible that fall within the spirit of a system for cooling an automobile without relying on battery power or operating an engine. Accordingly, it is intended that the claims be interpreted in view of the spirit and scope of the invention.

What is claimed is:

1. A cooling system for the passenger compartment of an automobile, the automobile including a ventilation duct extending between a front portion of the automobile and passenger compartment for admitting external air to the compartment, said system comprising:

an evaporative cooler including a water reservoir, an evaporative mesh pad, a pump for circulating water from said reservoir to said pad and a fan for blowing air over said pad and into the passenger compartment, said pad being positioned in the ventilation duct in a path of the external air, said fan being positioned in the ventilation duct between the front portion and said pad for blowing air through said pad when the automobile is motionless, said water reservoir comprising a refillable enclosed tank positioned externally of the ventilation duct and said pump being located in said reservoir and connected to said pad by tubing for pumping water from said reservoir to said pad;

a solar energy system for converting solar energy to electrical power including a plurality of solar conversion units mounted externally of the automobile, said units being connected in an array to provide electrical current at a predetermined voltage; and a thermostatic switch positioned within the automobile, said switch being connected in a series circuit between said solar system and said evaporative cooler whereby a temperature within the automobile above a predetermined value will cause activation of said switch to permit current from said solar sysem to said evaporative cooler to activate said fan and said pump to effect cooling of the passenger compartment.

2. The system of claim 1 and including:
a rechargeable storage battery;
means connecting said battery in parallel circuit arrangement with said solar system whereby said solar system provides recharging current to said battery and said battery provides power to said evaporative cooler when the power output of said solar system is below a predetermined value.

3. The system of claim 2 wherein said connecting means comprises:
unidirectional conducting means for preventing current from said battery to said solar system; and
voltage regulating means for limiting the voltage applied to said battery from said solar system to a predetermined maximum value;

4. The system of claim 3 wherein said connecting means further includes a lightning protection circuit.

5. The system of claim 1 wherein said solar energy units comprise photovoltaic cells in the form of semiconductor devices consisting of plural layers of materials with differing electrical properties.

6. The system of claim 1 wherein said solar energy units comprise a plurality of metallic submicrometer dipole antennas deposited on a glass substrate.

7. The system of claim 1 wherein said solar energy units comprise a plurality of theremocouples on a substrate in a narrow strip form, the thermocouples being formed by printing with two different inks each containing a different powered metal.

* * * * *